(12) United States Patent
Kellner

(10) Patent No.: US 12,702,140 B2
(45) Date of Patent: Aug. 11, 2026

(54) REVERSE FLOW COMBINATION COOKING APPARATUS

(71) Applicant: Benjamin James Kellner, Shoreview, MN (US)

(72) Inventor: Benjamin James Kellner, Shoreview, MN (US)

( * ) Notice: Subject to any disclaimer, the term of this patent is extended or adjusted under 35 U.S.C. 154(b) by 518 days.

(21) Appl. No.: 18/178,811

(22) Filed: Mar. 6, 2023

(65) Prior Publication Data

US 2023/0276816 A1 Sep. 7, 2023

Related U.S. Application Data

(60) Provisional application No. 63/268,893, filed on Mar. 4, 2022.

(51) Int. Cl.

| | |
|---|---|
| ***A23B 4/052*** | (2006.01) |
| ***A47J 37/07*** | (2006.01) |
| ***F24B 1/20*** | (2006.01) |
| ***F24B 13/04*** | (2006.01) |
| ***F24C 15/14*** | (2006.01) |

(52) U.S. Cl.

CPC ........... *A23B 4/052* (2013.01); *A47J 37/0704* (2013.01); *A47J 37/0786* (2013.01); *F24B 1/20* (2013.01); *F24B 13/04* (2013.01); *F24C 15/14* (2013.01)

(58) Field of Classification Search

None

See application file for complete search history.

(56) References Cited

U.S. PATENT DOCUMENTS 2,909,170 A * 10/1959 Hathorn, Jr. ........ A47J 37/0704 126/163 A
4,700,618 A * 10/1987 Cox, Jr. ................ A23B 4/052 99/481
5,163,358 A 11/1992 Hanagan et al.
5,184,599 A 2/1993 Stuart
5,481,964 A * 1/1996 Kitten .................... F24B 1/207 99/450

(Continued)

FOREIGN PATENT DOCUMENTS

DE 102019107552 A1 * 9/2019 .......... A23B 4/0523
ES 2992311 T3 * 12/2024 .......... A47J 37/0754

(Continued)

*Primary Examiner* — Thor S Campbell

(74) *Attorney, Agent, or Firm* — Dunlap Bennett & Ludwig PLLC

(57) ABSTRACT

A combination cooking apparatus that combines a reverse flow indirect-heat smoker with a pellet fuel heat grill in a single cooking chamber having a smoke tunnel, for smoke developed by the indirect smoker heat source on a first side of the cooking chamber to pass laterally to an opposing second side of the cooking chamber adjacent the pellet fuel heat source. A smokestack disposed on the second side communicates with the external environment, enabling reverse flow functionality of the smoke of the indirect smoker heat source as it is redirected back toward the smokestack. A movable chamber flap operatively associated with the smoke tunnel to be movable between an open condition and a closed condition so that a user can select an indirect heat associated with pellet fuel or an indirect heat associated with the indirect smoker heat source, respectively, within the cooking chamber.

7 Claims, 3 Drawing Sheets

(56) References Cited

U.S. PATENT DOCUMENTS 7,159,509 B2 * 1/2007 Starkey ............... A47J 37/0704 126/25 R
7,624,675 B2 * 12/2009 Galdamez .............. A23B 4/052 126/25 R
10,292,531 B1 * 5/2019 Hancock .............. A23B 4/0523
10,495,317 B1 * 12/2019 Hancock ............. A47J 37/0713
10,986,960 B2 4/2021 Colston
11,259,667 B2 3/2022 Colston et al.
11,375,725 B1 * 7/2022 Morales ................ A47J 37/041
12,016,490 B2 * 6/2024 Barnett ............... A47J 37/0704
2003/0217647 A1 * 11/2003 Jones ..................... G06Q 10/10 99/450
2004/0226550 A1 11/2004 Hutton et al.
2016/0095328 A1 * 4/2016 Reed ................... A47J 37/0781 99/481
2019/0374065 A1 * 12/2019 Hancock ............. A47J 37/0704
2020/0054032 A1 * 2/2020 Garces ................. A23B 4/0523
2020/0214501 A1 7/2020 Gafford et al.
2020/0221717 A1 7/2020 Jackson
2020/0237145 A1 7/2020 Donnelly et al.
2020/0375396 A1 * 12/2020 Rahmani ............. A47J 37/0786
2021/0352923 A1 11/2021 Li et al.
2022/0039596 A1 2/2022 Dahle et al.
2022/0071444 A1 3/2022 Springer
2022/0079383 A1 3/2022 Mercer et al.
2022/0087475 A1 3/2022 Terrell et al.
2022/0279967 A1 9/2022 VanDyke et al.
2022/0279969 A1 * 9/2022 Vandyke ............. A47J 37/0713
2022/0287504 A1 9/2022 Simon et al.
2022/0299207 A1 * 9/2022 Bennett ................... F24C 15/14
2023/0276816 A1 * 9/2023 Kellner .................. A23B 4/052 426/314
2025/0031709 A1 * 1/2025 Youssef ............... A23B 4/0523
2025/0194618 A1 * 6/2025 Rose ...................... A23B 4/044

FOREIGN PATENT DOCUMENTS

KR 20230166426 A * 12/2023 .............. F24B 1/024
WO WO-2023034637 A1 * 3/2023 ............. A23B 4/044

* cited by examiner

REVERSE FLOW COMBINATION COOKING APPARATUS

CROSS-REFERENCE TO RELATED APPLICATION

This application claims the benefit of priority of U.S. provisional application No. 63/268,893, filed Mar. 4, 2022, the contents of which are herein incorporated by reference.

BACKGROUND OF THE INVENTION

The present invention relates to outdoor cooking apparatuses, and more particularly to a combination grill and smoker with reverse flow functionality.

For many outdoor grill chefs, it is desirable to prepare foods by different cooking methods. Smokers have been a long-standing food preparation technique where the food is cooked indirectly from a heat source that provides a source of smoke flavoring to the foods. Typically, the heat source is a charcoal or hardwood that is burned in a firebox and the heat and smoke developed are laterally carried to a cooking chamber containing the food product.

Separately, grills are also a popular apparatus for cooking foods. Typically, the grill has one or more grates that are positioned directly above the heat source. Traditionally, the heat source was also provided by the combustion of charcoal or hardwood, and later by propane or natural gas. More recently, pellet grills have been introduced, which utilize a pelletized combustion product that is advanced at a controlled rate into a combustion area.

A recurring problem, however, is that the various outdoor cooking apparatus take considerable space, which for most homeowners occupy significant space on decks, patios, and the like. Likewise, it is costly to buy and maintain multiple cookers if one wants to experience the two different distinct types (smokers and grills) of wood-fired cooking.

As can be seen, there is a need for a barbeque smoker that combines a traditional smoker with a pellet grill to efficiently solve the problem of wanting the convenience of a pellet grill and an indirect-heat smoker to prepare various food products without having to obtain and provide space for two separate outdoor cookers.

SUMMARY OF THE INVENTION

In one aspect of the present invention, a cooking apparatus provides a cooking chamber; an indirect first heat source disposed on a first side of the cooking chamber; a second heat source disposed on a second side of the cooking chamber; and a removable baffle embodied in a drip tray that defines a smoke tunnel extending between the first and second sides.

In another aspect of the present invention, the cooking apparatus further provides a chamber flap operatively associated with the drip tray so as to be movable between a closed position and an open position thereby determining the type of heat source, first or second heat source; further providing a grill transversely extending through the cooking chamber above the drip tray, wherein the first heat source includes an internal chimney directing to a first heat above the grill; further providing a smokestack operatively associated with the second side of the cooking chamber, wherein a second heat of the second heat source is selectively flowable from the second side to the first side through the smoke tunnel and then redirected to the smokestack, defining a reverse flow configuration.

The first heat source may be pellet based and housed in the internal chimney that provides a fly ash baffle. The fly ash baffle redirects and collects the fly ash that is produced by pellet fuel combustion. The pellet heat source comprises a pellet-fuel combustion device and may be disposed outside the cooking chamber. An auger may operatively associate the pellet-fuel combustion device with a pellet hopper.

The internal chimney is adapted to protect the burn pot of pellet fuel from excessive creosote buildup when opposite wood fuel smoker is used excessively. This chimney and the fly ash baffle are important for diverting the fly ash that is created with pellet fuel combustion, thereby facilitating the clean functionality and separation of both heat sources.

In yet another aspect of the present invention, a method of providing indirect pellet-fuel heat grilling of a food product or indirect heat smoking of the food product, the method including: placing a pellet fuel heat source on a first side of a cooking chamber; placing a wood split heat source on a second side of a cooking chamber; disposing a smokestack on said second side; operatively associating a drip tray between the pellet fuel heat source and indirect wood split heat sources, thereby defining a smoke tunnel therebetween wherein a second heat and associated smoke selectively flows through the smoke tunnel and the second side and then redirects back toward the smokestack.

In another aspect of the present invention, a cooking apparatus includes the following: a cooking chamber; a grate disposed within the cooking chamber; a first heat source disposed on a first side of the cooking chamber, offset from the grate; a second heat source disposed on a second side of the cooking chamber, offset from the grate; a drip tray extending between the first and second sides so as to define a smoke tunnel from the second heat source to the first side; and a chamber flap operatively associated with the drip tray to be moveable between a closed condition and an open condition enabling a second heat and associated smoke to flow from the second heat source to above the drip tray, wherein the first and second sides are spaced apart by at least two feet. By offset, it is understood that the heat source is not directly, vertically below a portion of the grate.

These and other features, aspects and advantages of the present invention will become better understood with reference to the following drawings, description, and claims.

DETAILED DESCRIPTION OF THE INVENTION

Figure 1:
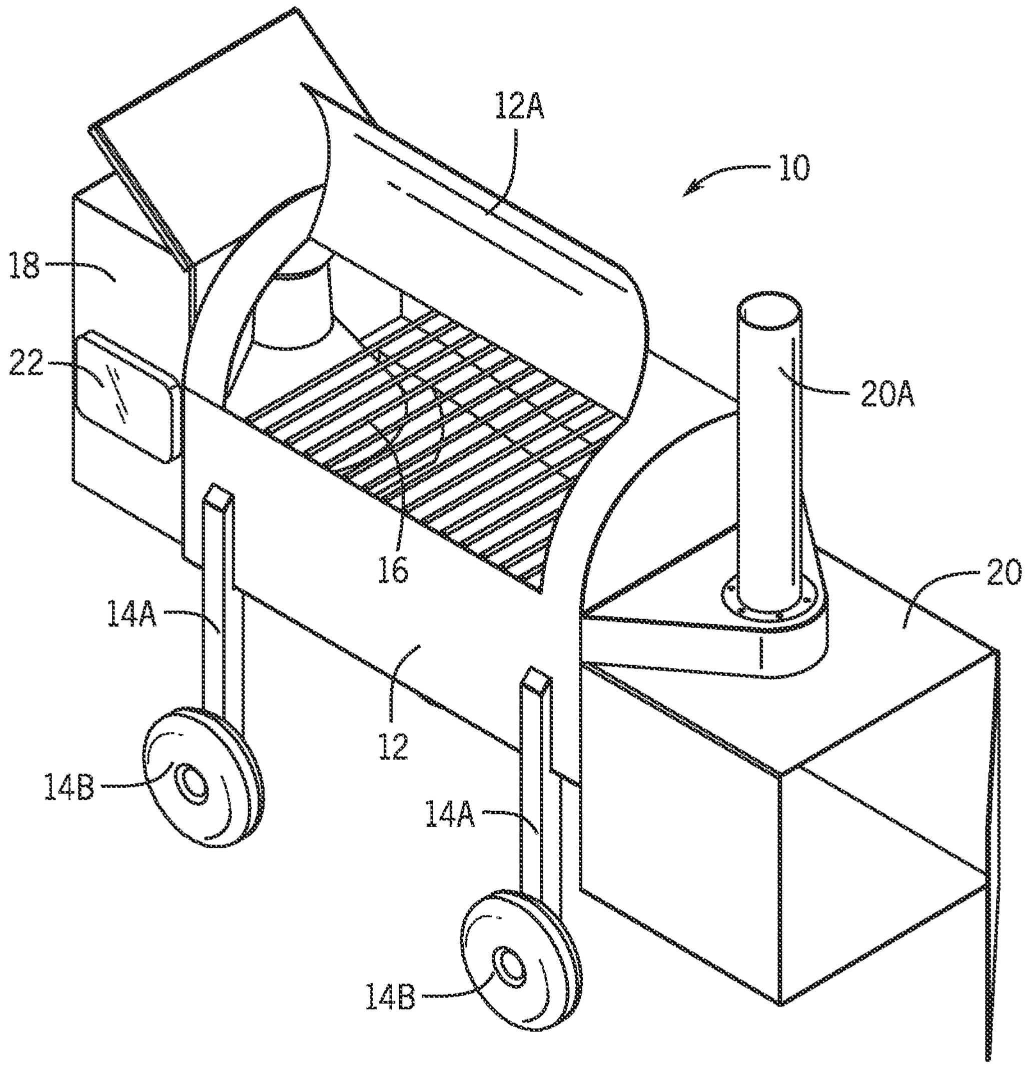
FIG. 1 is a top front perspective view of an exemplary embodiment of a combination cooker of the present invention.
Figure 2:
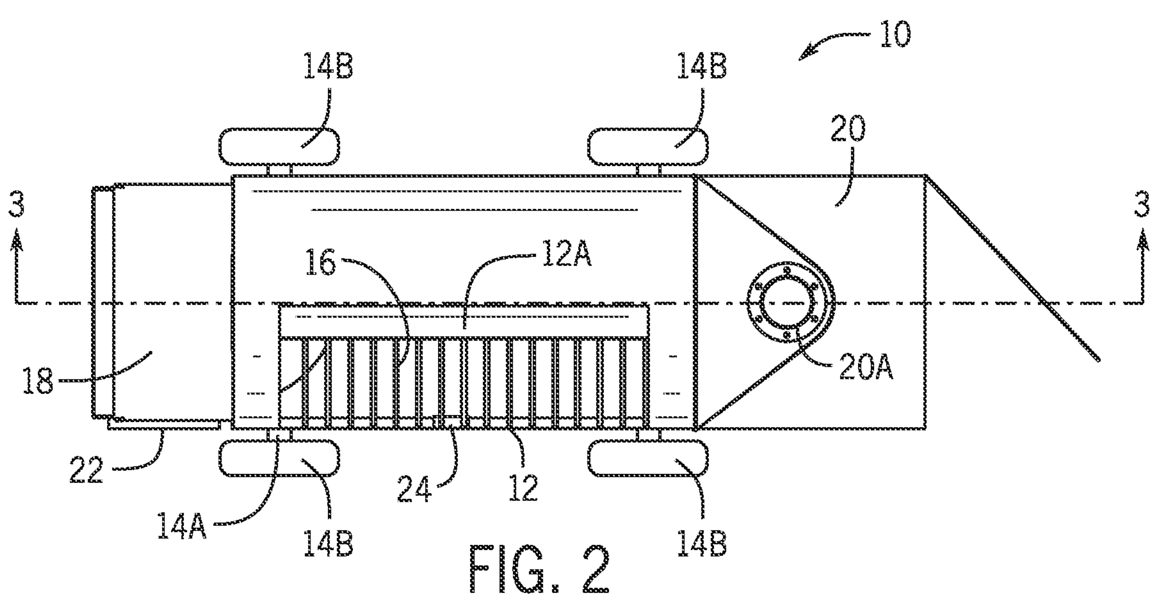
FIG. 2 is a top plan view of an exemplary embodiment of the combination cooker of the present invention.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, embodiments of the present invention provide a combination cooking apparatus that combines a reverse flow indirect-heat smoker with a pellet fuel heat grill in a single cooking chamber having a smoke tunnel, for smoke developed by the indirect smoker heat source on a first side of the cooking chamber to pass laterally to an opposing second side of the cooking chamber adjacent the pellet fuel heat source. A smokestack disposed on the second side communicates with the external environment, enabling reverse flow functionality of the smoke of the indirect smoker heat source as it is redirected back toward the smokestack. A movable chamber flap operatively associated with the smoke tunnel to be movable between an open condition and a closed condition so that a user can select an indirect heat associated with pellet fuel or an indirect heat associated with the indirect smoker heat source, respectively, within the cooking chamber.

Referring to FIGS. 1-5, the present invention may include a reverse flow combination cooking apparatus 10. The reverse flow combination cooking apparatus 10 may include a cooking chamber 12 that is supported by multiple legs 14A. Support feet or ground transport wheels 14B may be coupled to some or all the multiple legs 14B to facilitate movement and repositioning of the reverse flow combination cooking apparatus 10. Cooking chamber 12 includes a grate 16 that is dimensioned and adapted to accommodate and support food products for cooking. Grate 16 is disposed immediately above a drip tray 32.

Within the cooking chamber 12 is a first indirect heat source 28 and a second indirect heat source 20. The first heat source may include a combustion area (or volume) from which heat emanates, wherein the combustion area is housed within an internal chimney 34 of the cooking chamber 12. This internal chimney 34 may extend to an outlet 35 above the grate 16.

The term 'pellet fuel heat' may be understood to be a heat-emitting combustive mass from a pellet fuel burn pot (combustions area), through the internal chimney 34 that contains a series of fly ash baffles 36, though it is understood that other structures are contemplated herein if they produce sufficient heat to cook the supported food products while controlling creosote and fly ash, as well as outputting the first heat above the grate 16. The heat-emitting combustive mass may include fluids or gases that are actively undergoing combustion or the process of burning. The pellet fuel heat source 28 may be operatively associated with a conduit 26, such as but not limited to an auger, for conveying a combustible feed, such as but not limited to pellets to the pellet fuel heat source 28 for combustion. The distal end of the conduit 26 may occupy a feed hopper 18 attached to a first side of the cooking chamber 12. The feed hopper 18 may include a pellet controller 22 that is configured to regulate the flow of pellets to maintain an alternative heat source for preparing the food products. A thermocouple may be provided to measure the temperature within cooking chamber 12, wherein the thermocouple communicates with the pellet controller 22. The controller will also regulate the wood split fuel side allowing a more enjoyable traditional wood fired smoking experience.

The second heat source 20 may be associated with the second side of the cooking chamber 12. The second heat from the second heat source is also indirect, in that it is not directly under the grate 16, but rather off to the side. The term second heat may be understood to be a heat-emitting combustive mass that produces food-flavoring smoke, e.g., wood split fuel. The indirect heat source 20 may be a firebox containing a quantity of combustion products, such as charcoal or hardwoods, adaptive to provide a source of heat and flavoring smoke for preparing the food products.

Figure 3:
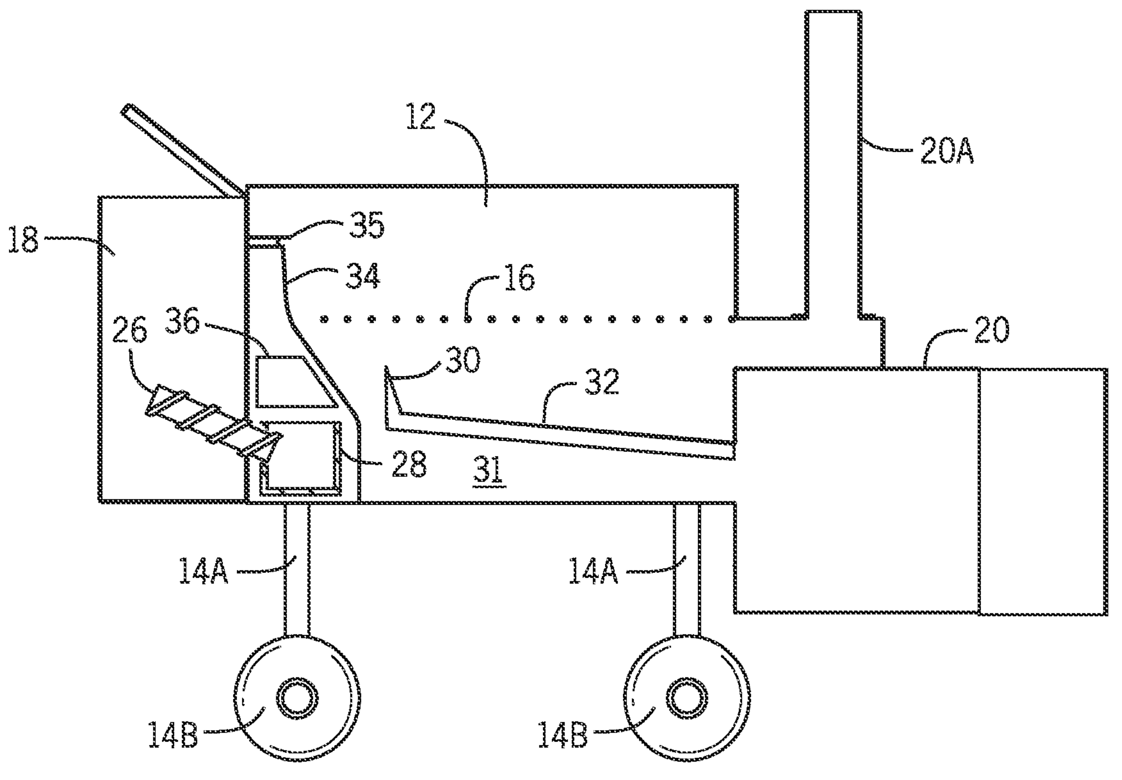
FIG. 3 is a cross-sectional view of an exemplary embodiment of a combination cooker of the present invention, taken on line 3-3 of FIG. 2, with a chamber flap 30 in an open position, enabling a second heat and associated smoke to enter the cooking chamber 12 above the drip tray 32.
Figures 4, 5:
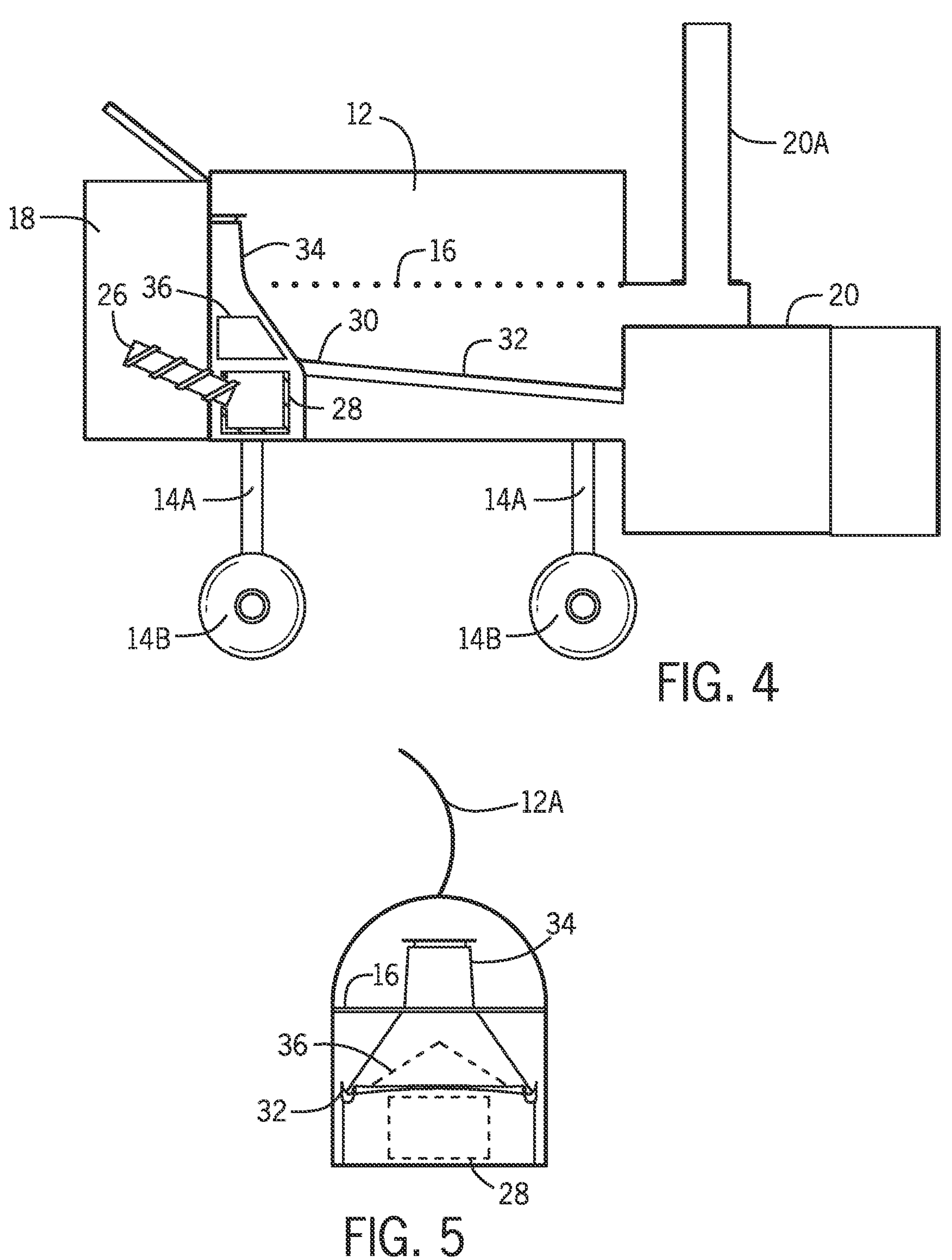
FIG. 4 is a cross-sectional view of an exemplary embodiment of a combination cooker of the present invention, with the chamber flap 30 in the closed position, thereby defining a closed condition preventing the second heat and associated smoke from entering the cooking chamber 12 above the drip tray 32.
FIG. 5 is a detailed cross-sectional view of an exemplary embodiment of the cooking chamber 12 of the present invention, taken orthogonal relative to FIG. 4, illustrating the internal chimney 34.

The drip tray 32 defines a smoke tunnel space 31 between itself and the bottom of the cooking chamber 12. The drip tray 32 may be a removable baffle disposed adjacent to a lower portion of the cooking chamber 12, defining the smoke tunnel 31 between the lower portion of the cooking chamber 12 and the bottom thereof. The drip tray 32 may slant downward as it extends side-to-side (from the first side to a second side) across the cooking chamber 12, as shown in FIGS. 3 and 4. The drip tray 32 may have a chamber flap 30, essentially an extension of the drip tray/baffle 32 that is movable between an open position and a closed position, as illustrated in FIGS. 3 and 4, respectively. The closed position interconnects the drip tray 32 to the first side wall and chimney 34 surface, thereby preventing the flow of second heat (from the second heat source 20) and associated smoke into the cooking chamber 12 above the drip tray 32. While the chamber flap 30 is closed one may use the pellet fuel option. When the chamber flap 30 is in the open position the drip pan/baffle 32 allows fluid/gas/smoke from the second-side indirect heat source 20 to pass (around, but not through or inside of, the internal chimney 34), thereby an "open condition" allows one to use the wood burning side and enables the above-mentioned reverse flow functionality.

The positioning of the chamber flap 30 facilitates the choice of switching between reverse flow smoking or pellet smoking. This is the signature or critical feature that makes the present invention selectable between a pellet-fuel grill and a reverse flow smoker. In other words, the chamber flap 30 regulates airflow through the cooking chamber 12.

The removable drip tray/baffle 32 is configured as a thermal mass that extends from the indirect heat source 20 across the lower portion of the cooking chamber 12 to distribute the heat and smoke developed in the indirect heat source 20 evenly beneath the grate 16.

For reverse flow smoking, the indirect heat source 20 may be used to cook food products within the cooking chamber 12 using wood splits or charcoal. In one embodiment, a user may ignite charcoal in the firebox 20, and then add wood splits or charcoal to control temperature. The resulting temperature can be read on the thermometer or the thermocouple to assist in regulating the temperature with the help of the controller located on apparatus 10. Throughout the smoking, the user can keep adding wood/charcoal to the fire as needed to reach and maintain the desired temperature within the cooking chamber.

This is an advantage of the reverse flow operation of the present invention. Unlike traditional flow smokers where the smoke and combustion gases flow straight through the cooking chamber 12 and exits the smokestack 20A. The reverse flow smoker works by the indirect heat source 20 combustion gases flowing through the smoke tunnel 31 to the opposite side (from the right, second side to the left, first side in view FIG. 3) and then redirected back to the second side where the smokestack 20A is located and where the gasses eventually exit to the external environment. This also eliminates the need for a large indirect heat source 20 (e.g., firebox) because the combustion gases now have time to travel under the removable drip tray/smoke tunnel 32 allowing for more even heating and space saving.

For pellet grilling, the first side of the reverse flow combination cooking apparatus 10 may be configured as a set and forget type of wood fired cooking experience. The user simply adds a quantity of pellets to the feed hopper 18, sets the desired temperature with the controller 22 and replenishes pellets as needed. The reverse flow combination cooking apparatus 10 of the present invention gives a user the option of which type of wood fire cooking they have time for. It also reduces the number of grills/smokers one needs to possess to both apply pellet fuel heat (pellet grill) and indirect heat (smoker). The present invention also increases the ability to accomplish several different cooking styles and decreases the overall grill footprint. The present invention also engenders the ability to grill/smoke completely off-grid, while decreasing one's dependency on fossil fuels, and facilitating all the benefits of a pellet grill with no strings attached as well as the fuel cost savings with thermal mass technology.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A cooking apparatus comprising:

a cooking chamber;

a grate disposed within the cooking chamber;

a first heat source disposed on a first side of the cooking chamber, offset from the grate;

a second heat source disposed on a second side of the cooking chamber, offset from the grate;

a drip tray extending between the first and second sides so as to define a smoke tunnel from the second heat source to the first side;

a chamber flap operatively associated with a first portion of the drip tray, wherein said first portion is disposed on the first side;

the chamber flap moveable between a closed condition and an open condition enabling a second heat and associated smoke to flow directly from the second heat source to the first side, wherein the first and second sides are spaced apart by at least two feet; and a smokestack directly communicating the second side with an external environment, whereby said associated smoke must flow from the second heat source to the first side and then to the second side before flowing through the smokestack.

2. The cooking apparatus of claim 1, further comprising an internal chimney housing the first heat source, wherein the internal chimney has an output disposed above the grate.

3. The cooking apparatus of claim 2, wherein the first heat source is a pellet fuel heat source.

4. The cooking apparatus of claim 3, wherein the second heat source is a wood split heat source.

5. The cooking apparatus of claim 3, wherein the pellet fuel heat source comprises a pellet-fuel combustion device, and wherein a pellet hopper is disposed outside the cooking chamber.

6. The cooking apparatus of claim 5, further comprising an auger operatively associating the pellet-fuel combustion device and the pellet hopper.

7. The cooking apparatus of claim 6, wherein a top portion of the drip tray is disposed below the grate, and wherein the drip tray is removable.

* * * * *